(12) United States Patent
Park et al.

(10) Patent No.: US 11,853,929 B2
(45) Date of Patent: Dec. 26, 2023

(54) AUTOMATIC ANALYSIS METHOD OF INFRASTRUCTURE OPERATION DATA AND SYSTEM THEREOF

(71) Applicant: Samsung Display Co., Ltd., Yongin-si (KR)

(72) Inventors: Younggyu Park, Cheonan-si (KR); Hyunuk Shin, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 249 days.

(21) Appl. No.: 16/189,921

(22) Filed: Nov. 13, 2018

(65) Prior Publication Data
US 2019/0197441 A1 Jun. 27, 2019

(30) Foreign Application Priority Data
Dec. 22, 2017 (KR) .......................... 10-2017-0177645

(51) Int. Cl.
*G06Q 10/0631* (2023.01)
*G06F 11/30* (2006.01)
(Continued)

(52) U.S. Cl.
CPC ..... *G06Q 10/0631* (2013.01); *G06F 11/3006* (2013.01); *G06F 17/18* (2013.01); *G06Q 10/06395* (2013.01)

(58) Field of Classification Search
CPC ..... G06Q 10/0631; G06Q 1010/06312; G06Q 10/06315; G06Q 10/06375;
(Continued)

(56) References Cited

U.S. PATENT DOCUMENTS 6,604,012 B1 8/2003 Cho et al.
7,475,122 B2 * 1/2009 Azpitarte ............ G06F 11/0748
702/182
(Continued)

FOREIGN PATENT DOCUMENTS

KR 1997-0051986 A 7/1997
KR 10-2001-0038300 A 5/2001
(Continued)

OTHER PUBLICATIONS

Ogden et al., A Multi-Variate Statistical Approach for Anomaly Detection and Condition Based Maintenance in Complex Systems, Sep. 1, 2017, 2017 IEEE Autotesticon, pp. 1-8 (Year: 2017).*

*Primary Examiner* — Robert D Rines
(74) *Attorney, Agent, or Firm* — Lewis Roca Rothgerber Christie LLP

(57) ABSTRACT

In a system of automatically analyzing infrastructure operation data, the system includes: an infrastructure operation determination unit configured to determine whether or not to execute an automatic analysis on infrastructure operation data; a data reception unit configured to receive operation data of a previous operation period and operation data of a succeeding operation period according to the automatic analysis execution; a statistics calculation unit configured to calculate statistics for the operation data of the previous operation period and the operation data of the succeeding operation period; and a significant difference analysis unit configured to analyze a significant difference between the operation data of the previous operation period and the operation data of the succeeding operation period based on the statistics.

26 Claims, 9 Drawing Sheets

(51) Int. Cl.
*G06F 17/18* (2006.01)
*G06Q 10/0639* (2023.01)

(58) Field of Classification Search
CPC .......... G06Q 10/06393; G06F 11/3006; G06F 17/18; G06F 11/26; H04L 43/08; G05B 23/0283; G05B 23/0286; G05B 23/00; G05B 23/0205; G05B 23/0262; G05B 23/026
See application file for complete search history.

(56) References Cited

U.S. PATENT DOCUMENTS

| | | | | |
|---|---|---|---|---|
| 10,025,887 | B1* | 7/2018 | Santarone | G01S 19/071 |
| 10,120,375 | B2* | 11/2018 | Przybylski | G05B 23/0297 |
| 2003/0135349 | A1* | 7/2003 | Yoshie | G05B 23/0275 |
| | | | | 702/183 |
| 2004/0088069 | A1* | 5/2004 | Singh | G06Q 50/06 |
| | | | | 700/108 |
| 2006/0116836 | A1* | 6/2006 | Yoshie | G05B 23/0229 |
| | | | | 702/85 |
| 2013/0151199 | A1* | 6/2013 | Hadley | G05B 23/024 |
| | | | | 702/183 |
| 2014/0278234 | A1 | 9/2014 | Chang et al. | |
| 2015/0057810 | A1* | 2/2015 | Smith | G05B 13/024 |
| | | | | 700/276 |
| 2016/0340059 | A1* | 11/2016 | Pettre | B64D 45/00 |
| 2018/0107934 | A1* | 4/2018 | Noda | G06Q 10/0631 |
| 2018/0196402 | A1* | 7/2018 | Glaser | G05B 15/02 |
| 2018/0341255 | A1* | 11/2018 | Turney | G06Q 10/20 |
| 2018/0347843 | A1* | 12/2018 | Friedenberger | G05B 23/0243 |
| 2019/0018402 | A1* | 1/2019 | Enomoto | G05B 19/41875 |
| 2019/0042545 | A1* | 2/2019 | Boutaud | G05B 23/024 |
| 2019/0273628 | A1* | 9/2019 | Burtscher | H04L 12/282 |
| 2020/0090289 | A1* | 3/2020 | Elbsat | G06Q 50/163 |

FOREIGN PATENT DOCUMENTS

| | | |
|---|---|---|
| KR | 10-0880656 B1 | 1/2009 |
| KR | 10-2014-0113153 A | 9/2014 |
| KR | 10-2015-0101203 A | 9/2015 |
| KR | 10-2016-0064679 A | 6/2016 |

* cited by examiner

FIG. 6

Report: Analysis report on significant differences in facility operation

| purpose | Strengthen monitoring and analysis of quality fluctuations by analyzing significant differences of operation data before and after operation of infrastructure | Date of publication | 2017-04-09 10:00 |
|---|---|---|---|
| Classification | - Analysis classification: Operation analysis (detect facility state changes) or daily analysis<br>- Target quantity: the number of target parameters for the significant difference analysis<br>- Non-identical: the number of non-identical parameters (compare before/after data center value differences) as a result of identity verification<br>- Out of control: the number of parameters exceeding the significant difference control standard (automatically calculate UCL and LCL for significant difference control) | | - Change rate increase: the number of parameters increased in change rate (change rate = spread ÷ average × 100)<br>- Final pass rate: a pass parameter rate as a result of before/after significant difference determination (non-analysis items excluded)<br>- Start of non-operation: the time when the facility state is changed to a non-operational state (Process-> Down / Idle / Run)<br>- Start of operation: the time when the facility state is changed to an operational state (Down/Idle/Run->Process) |

☐ Report: Analysis report on significant differences in facility operation

| NO | Analysis classification | Facility name | Parameter analysis result | | | | Final determined pass rate | Detailed analysis | Change of facility operation state | |
|---|---|---|---|---|---|---|---|---|---|---|
| | | | Target quantity | Non-identical | Change rate increase | Out of control | | | Non-operation start time | Operation start time |
| 1 | Operation analysis | Equipement_Nodule_Unit_001 | 10 | 2 | 1 | 1 | 80% | View | 2017-04-01 14:00 | 2017-04-06 6:13 |
| 2 | Operation analysis | Equipement_Nodule_Unit_002 | 20 | 0 | 0 | 0 | 100% | View | 2017-03-10 2:00 | 2017-04-06 6:30 |
| 3 | Operation analysis | Equipement_Nodule_Unit_003 | 10 | 0 | 0 | 0 | 100% | View | 2017-03-01 15:00 | 2017-04-06 6:48 |
| 4 | Operation analysis | Equipement_Nodule_Unit_004 | 20 | 2 | 1 | 1 | 80% | View | 2017-04-12 18:00 | 2017-04-06 6:08 |

FIG. 7

[Equipment]

| Analysis classification | EQP Unit | Parameter analysis result | | | | | Change of facility operation state | | | Before period (past operation period) | | | After period (recent operation period) | | | standard of facility operation determination (hr) | | Before (standard) data operation determination (hr) | | After (target) data | |
|---|---|---|---|---|---|---|---|---|---|---|---|---|---|---|---|---|---|---|---|---|---|
| | | Target quantity | Non-identical | Change rate increase | Out of control | Final determined pass rate | | Non-operation start time | Operation start time | Start | End | Start | End | Minimum operation period | Minimum non-operation period | period (hr) | BOB period | period (hr) | Setting time (minutes) |
| Operation analysis | Equipment 001 | 10 | 2 | 1 | 1 | 80% | | 2017-03-30 11:00 | 2017-04-09 11:00 | 2017-03-22 14:00 | 2017-03-30 11:00 | 2017-04-09 11:00 | 2017-04-10 11:00 | 72 | 8 | 216 | N | 24 | 10 |

[Parameter]

| No | Parameter Name | Priority | Final result | Identity verification | | | | | Change rate verification | | | | Control verification | | | | Data Count | | Set verification standards | | |
|---|---|---|---|---|---|---|---|---|---|---|---|---|---|---|---|---|---|---|---|---|---|
| | | | | Center value | | Standard deviation | | Result | Before(%) | After(%) | Difference (Aft-Bef) | | UCL | LCL | Out Count | PSI(%) | Before | After | Meaningful level in identity verification | Standard of difference in change rate verification | Control verification Tolerance |
| | | | | Before | After | Before | After | | | | | | | | | | | | | | |
| 1 | Senscr 001 | A | pass | 78.7 | 75.3 | 78.7 | 75.3 | Identical | 78.7 | 75.3 | -3.4 | | 9.0458 | 8.8458 | 0 | 78.7 | 2553 | 285 | 0.05 | 0 | 3 |
| 2 | Senscr 002 | A | pass | 86.5 | 45.6 | 86.5 | 45.6 | Identical | 86.5 | 45.6 | -40.9 | | 7.66 | 74.6 | 0 | 86.5 | 2756 | 288 | 0.05 | 0 | 3 |
| 3 | Senscr 003 | B | pass | 46.5 | 75.9 | 46.5 | 75.9 | Identical | 46.5 | 75.9 | 29.4 | | 7.22 | 7.22 | 0 | 46.5 | 2880 | 200 | 0.05 | 0 | 3 |
| 4 | Senscr 004 | B | Fail | 76.2 | 62.3 | 76.2 | 62.3 | Identical | 76.2 | 62.3 | -13.9 | | 6.03 | 5.83 | 1 | 76.2 | 2687 | 275 | 0.05 | 0 | 3 |
| 5 | Senscr 005 | A | Fail | 93.4 | 46.8 | 93.4 | 46.8 | Identical | 93.4 | 46.8 | -46.6 | | 6.6 | 6.4 | 3 | 93.4 | 2586 | 235 | 0.05 | 0 | 3 |
| 6 | Senscr 006 | A | Fail | 45.2 | 65.3 | 45.2 | 65.3 | Non-identical | 45.2 | 65.3 | 20.1 | | 9.0458 | 8.8458 | 1 | 45.2 | 2553 | 285 | 0.05 | 0 | 3 |

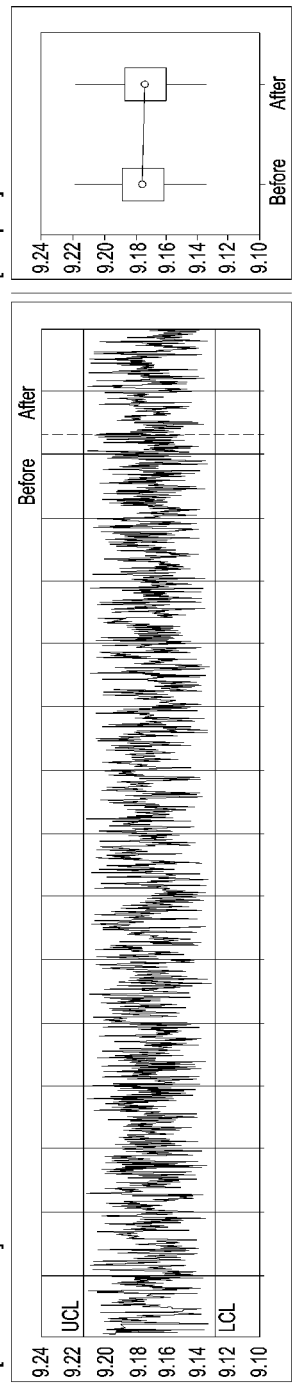

AUTOMATIC ANALYSIS METHOD OF INFRASTRUCTURE OPERATION DATA AND SYSTEM THEREOF

CROSS-REFERENCE TO RELATED APPLICATION

This application claims priority to and the benefit of Korean Patent Application No. 10-2017-0177645, filed on Dec. 22, 2017, in the Korean Intellectual Property Office (KIPO), the disclosure of which is incorporated by reference herein in its entirety.

BACKGROUND

1. Field

Aspects of some example embodiments of the present invention relate to a method and a system of automatically analyzing infrastructure operation data.

2. Discussion of Related Art

A system of monitoring quality abnormalities for infrastructures, which provide utility, such as air conditioners, freezers, boilers, air compressors, ultrapure water feeders, and gas or chemical feeders, is a system that collects, in real time, various sensor data measured from the infrastructure and peripherals, and sets the specification to monitor constantly whether the sensor data is out of the specification during the operation. An example of the quality abnormality monitoring system for infrastructures may include a fault detection and classification ("FDC") system.

The infrastructure that should supply refined utilities stably with accurate quantities does not have a unit standard, such as product manufacturing units or the LOT of manufacturing facilities. Further, a summary data, e.g., an average or a dispersion, for the data that is collected in real time (e.g., in seconds) is generated at an interval of 5 minutes, 1 hour, 1 day, or the like.

Such data is used for monitoring or analysis, and when an abnormality is detected, the system notifies the abnormality and/or requests the manager to take appropriate measures.

However, there may be a case where the setting of the specification and the interpretation on the monitoring results are different depending on engineers, and it is difficult to optimize the specification for detecting abnormal symptoms or conditions. In addition, it is not easy for engineers to perform appropriate statistical analysis according to the characteristics and distribution of the generated data.

In addition, it may be difficult to select the data period when the infrastructure is a facility which operates at all times to output data constantly. Although the operation state of the infrastructure may be determined in real time by the state combination, e.g., ON or OFF, of the peripheral facilities, it is difficult to execute automatic analysis because unexpected operation events and errors in the target analysis period may occur due to a temporary operation or non-operation of the facility.

An equality verification for the products manufactured by a manufacturing facility is an equality verification for each sensor data pattern or for each product in the repetitive processes. However, because there may be significant amounts of data that is not uniformly distributed due to the influence of season, outside temperature, load factor variation, or the like, a data analysis logic for the infrastructure may be utilized to consider those factors.

For a related-art equality verification, an average comparison (t-test) and a dispersion comparison (f-test) which are typically used in the statistics field may be utilized. In this case, functions to enable automatic correction of verification boundary ranges and setting of appropriate test standards are required depending on various sensor types and data characteristics.

It is to be understood that this background of the technology period is intended to provide useful background for understanding the technology and as such disclosed herein, the technology background period may include ideas, concepts or recognitions that do not constitute prior art.

SUMMARY

Aspects of some example embodiments of the present invention relate to a method and a system of automatically analyzing infrastructure operation data. For example, some embodiments may include a method and a system of analyzing whether there is a significant difference between data of a previous operation period and data of a succeeding operation period in the infrastructure.

Aspects of some example embodiments of the present invention may be directed to a system and a method of automatically analyzing a significant difference in infrastructure operation data.

According to some example embodiments of the present invention, a system of automatically analyzing infrastructure operation data includes: an infrastructure operation determination unit determining whether to execute an automatic analysis on infrastructure operation data; a data reception unit receiving operation data of a previous operation period and operation data of a succeeding operation period according to the automatic analysis execution; a statistics calculation unit calculating statistics for the operation data of the previous operation period and the operation data of the succeeding operation period; and a significant difference analysis unit analyzing a significant difference between the operation data of the previous operation period and the operation data of the succeeding operation period based on the statistics.

The previous operation period may be at least a minimum operation period or longer.

The previous operation period may be a best of best period.

Whether to execute the automatic analysis may be determined according to an operation state of the infrastructure and analysis conditions according to the operation state.

The succeeding operation period may be after a minimum non-operation period.

The significant difference analysis unit may analyze a significant difference between the operation data of the previous operation period and the operation data of the succeeding operation period by using at least one of an equality verification, a control level verification, and a change rate verification.

The system may further include a result determination unit determining a result of the significant difference analysis.

The significant difference analysis unit may set a verification boundary for the operation data and determine whether the operation data is within the verification boundary.

The significant difference analysis unit may set a correction value for the verification boundary by applying a skewness and a kurtosis of the operation data, and determine whether the operation data is within the verification boundary.

The significant difference analysis result may include a summary analysis result and a detailed analysis result.

The detailed analysis result may include a facility analysis result and an analysis result for each sensor.

The result determination unit may receive a determination for the significant difference analysis and registers the determination.

When a significant difference occurs in the operation data, the result determination unit may register a cause of the significant difference and results of responsive actions, calculate statistics of the cause and the results of the responsive actions, and learn the cause and the results of the responsive actions.

According to an embodiment, a method of automatically analyzing infrastructure operation data includes: determining whether to execute an automatic analysis on operation data of an infrastructure; receiving operation data of a previous operation period and operation data of a succeeding operation period according to the automatic analysis execution; calculating statistics for the operation data of the previous operation period and the operation data of the succeeding operation period; and analyzing a significant difference between the operation data of the previous operation period and the operation data of the succeeding operation period based on the statistics.

The previous operation period may be at least a minimum operation period or longer.

The previous operation period may be a best of best period.

Whether to execute the automatic analysis may be determined according to an operation state of the infrastructure and analysis conditions according to the operation state.

The succeeding operation period may be after a minimum non-operation period.

Analyzing the significant difference may include analyzing a significant difference between the operation data of the previous operation period and the operation data of the succeeding operation period by using at least one of an equality verification, a control level verification, and a change rate verification.

The method may further include determining a result of the significant difference analysis.

Analyzing the significant difference may include setting a verification boundary for the operation data and determining whether the operation data is within the verification boundary.

Analyzing the significant difference may include setting a correction value for the verification boundary by applying a skewness and a kurtosis of the operation data, and determining whether the operation data is within the verification boundary.

Determining the result of the significant difference analysis may include reporting a summary analysis result and a detailed analysis result.

The detailed analysis result may include a facility analysis result and an analysis result for each sensor.

Determining the result of the significant difference analysis may include receiving a determination of the significant difference analysis and registering the determination.

Determining the result of the significant difference analysis may include registering a cause of the significant difference and results of responsive actions, calculating statistics of the cause and the results of the responsive actions, and learning the cause and the results of the responsive actions, when a significant difference occurs in the operation data.

The foregoing is illustrative only and is not intended to be in any way limiting. In addition to the illustrative aspects, exemplary embodiments and features described above, further aspects, exemplary embodiments and features will become apparent by reference to the drawings and the following detailed description.

BRIEF DESCRIPTION OF THE DRAWINGS

A more complete appreciation of the present invention will become more apparent by describing in more detail aspects of some example embodiments thereof with reference to the accompanying drawings, wherein:

FIGS. 6 and 7 are views showing an automatic report screen according to some example embodiments of the present invention.

DETAILED DESCRIPTION

Figure 1:
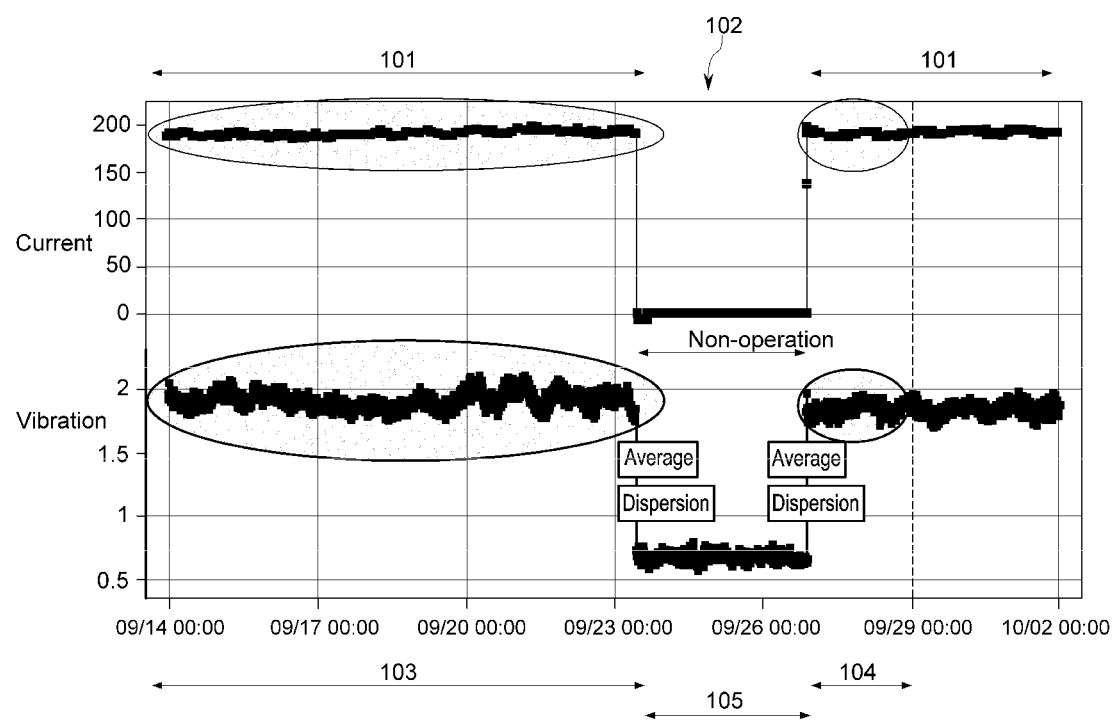
FIG. 1 is a view illustrating an operation period and a non-operation period of a system of automatically analyzing infrastructure data according to some example embodiments of the present invention.

Aspects of some example embodiments will now be described more fully hereinafter with reference to the accompanying drawings. Although the invention may be modified in various manners and have several example embodiments, aspects of some example embodiments are illustrated in the accompanying drawings and will be mainly described herein. However, the scope of the invention is not limited to the example embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "including," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present invention and like reference numerals refer to like elements throughout the specification.

Hereinafter, an embodiment of the present invention will be described with reference to FIGS. 1 to 8.

FIG. 1 is a view illustrating an operation period and a non-operation period of a system of automatically analyzing infrastructure data according to some example embodiments of the present invention.

Referring to FIG. 1, infrastructure data is collected in an operation period 101 and a non-operation period 102. The operation period 101 is a period in which the infrastructure facility is normally operating, and the non-operation period 102 is a period in which the infrastructure facility is not operated for a relatively long period or the infrastructure facility is not operated due to preventive maintenance (PM) or the like. During the preventive maintenance, preventive maintenance such as oil replenishment and replacing consumables, for example, gears and bearings may be carried out so that the facility may operate normally.

An operation period before the non-operation period is referred to as a previous operation period 103, and a specific operation period immediately after the non-operation is referred to as a succeeding operation period 104. The succeeding operation period 104 may be set as a period in which data may be sufficiently collected. The previous operation period is set to be longer than a minimum operation period. In such an embodiment, an instant operation is excluded from calculation of the minimum operation period. In addition, the non-operation period 102 is a period in which the facility is not operated for a minimum non-operation period 105 or longer.

In the case where the infrastructure facility is operated after the infrastructure facility stopped operating for a relatively long period of time or stopped operating due to the preventive maintenance or the like, data on the main sensors of the infrastructure facility in the previous operation period 103 and data on the main sensors of the infrastructure facility in the succeeding operation period 104 are collected, and it is automatically analyzed if there is a significant difference between the data collected in the previous operation period 103 and the data collected in the succeeding operation period 104. In such an embodiment, averages, distributions, or dispersions may be calculated for each of the data collected in the previous operation period 103 and the data collected in the succeeding operation period 104, and then compared.

That is, when the infrastructure facility is not operated for the minimum non-operation period or longer, and then restarts to operate for a certain period of time or longer, the operation of the infrastructure facility is automatically detected, and it is automatically analyzed if there is a significant difference between the data collected in the previous operation period 103 and the data collected in the succeeding operation period 104.

Figure 2:
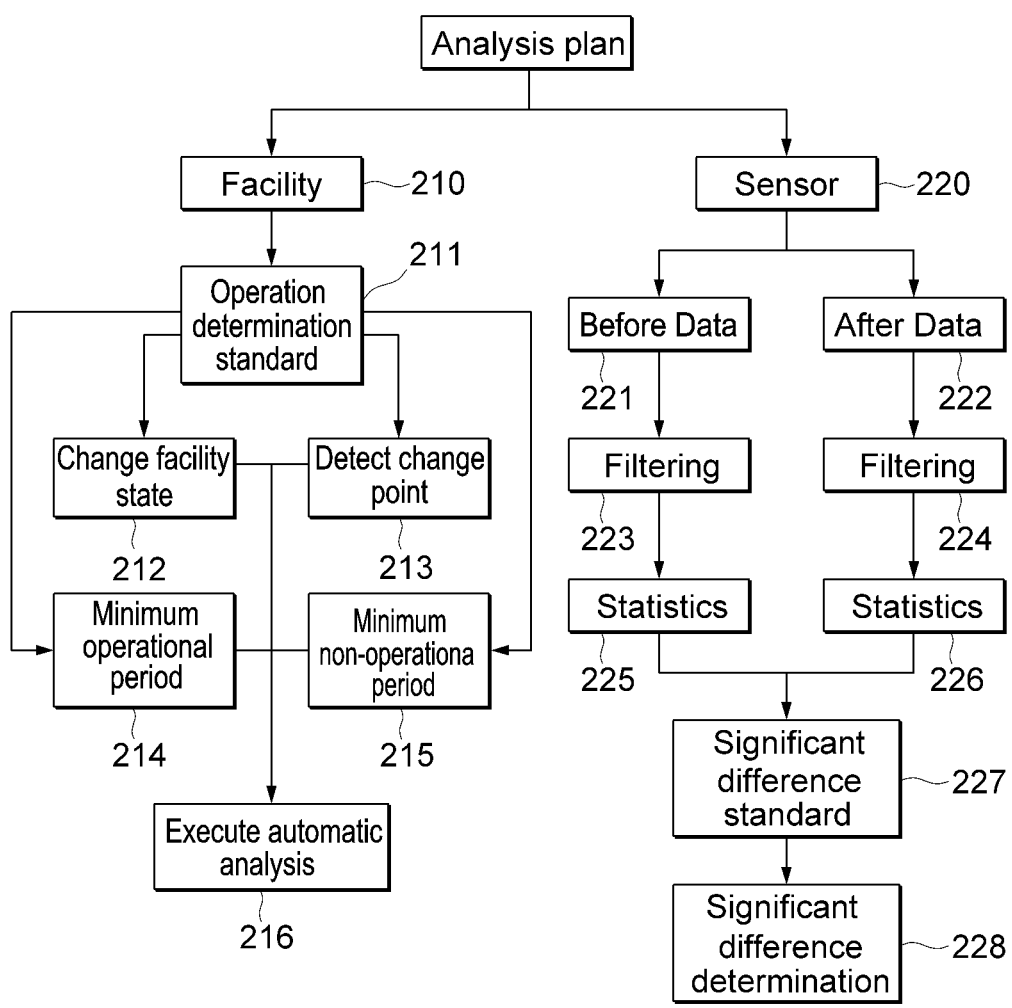
FIG. 2 is a view illustrating an operation structure of a system of automatically analyzing infrastructure data according to some example embodiments of the present invention.

FIG. 2 is a view illustrating an operation flow diagram of a system of automatically analyzing infrastructure data according to some example embodiments of the present invention.

Referring to FIG. 2, an analysis plan of a system of automatically analyzing infrastructure data is divided with respect to a facility 210 and a sensor 220. With respect to the facility 210, conditions under which the facility state changes or the analysis is to be executed are detected, and then an automatic analysis 216 is performed.

An operation determining standard 211 is determined in consideration of a facility state change 212, a change point detection 213, a minimum operation period 214, a minimum non-operation period 215, or the like. The facility state change 212 refers to a change of the infrastructure facility from operation to non-operation or from non-operation to operation. The change point detection 213 refers to a point in time when operation is changed to non-operation, or non-operation is changed to operation.

The minimum operation period 214 is a period in time for which the infrastructure facility should be minimally operated in the operation period before the non-operation period, and the minimum non-operation period 215 is a period in time for which the infrastructure facility should be minimally non-operated in the non-operation period. The change point detection 213 occurs at a point in time when the facility state change 212 occurs as the operation period is changed to the non-operation period. It is then determined whether or not the operation period satisfies the minimum operation period 214, and when the operation period is longer than or substantially equal to the minimum operation period 214, the operation period is designated as the previous operation period 103.

When the facility state change 212 occurs from the non-operation period to the operation period, it is determined whether or not the non-operation period satisfies the minimum non-operation period 215. In such an embodiment, the change point detection 213 occurs at a point in time when the non-operation period is changed to the operation period. In addition, when the infrastructure facility operates for a predetermined period of time or longer after the change point detection 213 occurs, a point in time a predetermined time after the change point is designated as the succeeding operation period 104.

It is determined whether or not to execute the automatic analysis 216 in consideration of the operation determining standard 211, such as the facility state change 212, the change point detection 213, the minimum operation period 214, the minimum non-operation period 215, or the like. That is, it is determined whether or not the facility state change 212 occurs from the operation period to the non-operation period, whether the change point detection 213 occurs, whether the operation period is the minimum operation period 214 or longer, and whether the non-operation period is the minimum non-operation period 215 or longer. Thereafter, in the case where the facility state change 212 has occurred from the non-operation period to the operation period, the change point detection 213 has occurred, and the infrastructure facility is operated for a period (e.g., a predetermined period) or longer after the change point, the automatic analysis 216 is performed on whether or not there is a significant difference between the data collected in the previous operation period 103 and the data collected in the succeeding operation period 104.

The data collected in the previous operation period 103 and the data collected in the succeeding operation period 104 are collected by the sensor 220. The data collected in the previous operation period 103 is a before data 221, and the data collected in the succeeding operation period 104 is an after data 222. The before data 221 and the after data 222 are subject to filtering 223 and 224, respectively, and the data processed with the filtering 223 and 224 are calculated by using statistics 225 and 226, for example, average, distribution, or dispersion.

A significant difference standard 227 is set to determine if there is a significant difference between the before data 221 and the after data 222. The significant difference standard 227 may be used in significant difference determination 228 to determine whether or not there is an abnormality in the data or whether the infrastructure facility is normally operated when the difference is higher or lower than the standard.

Figure 3:
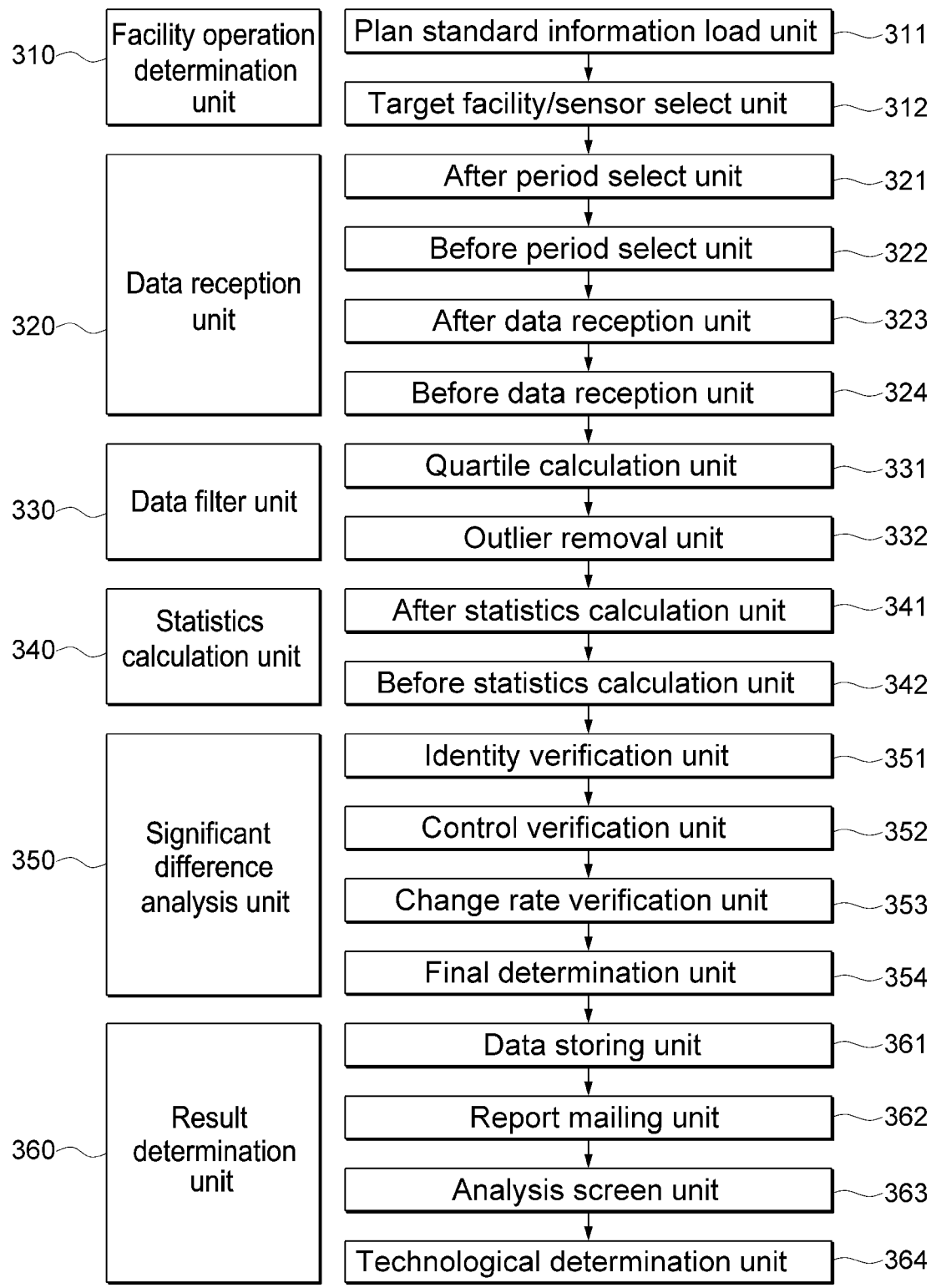
FIG. 3 is a view illustrating a system of automatically analyzing infrastructure operation data according to some example embodiments of the present invention.
Figure 4A:
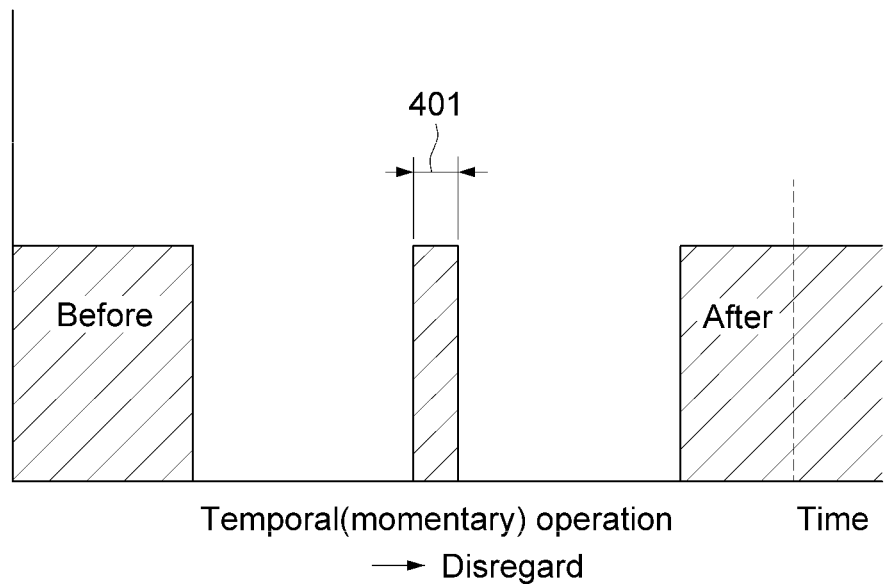
FIGS. 4A, 4B, 4C, and 4D are views illustrating standards for determining the operation of infrastructure facilities.
Figure 4B:
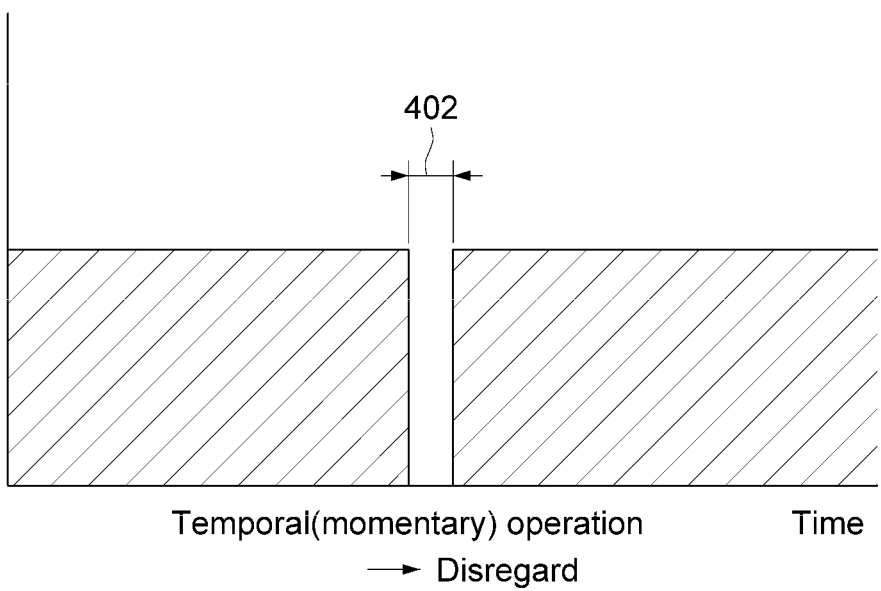
Figure 4C:
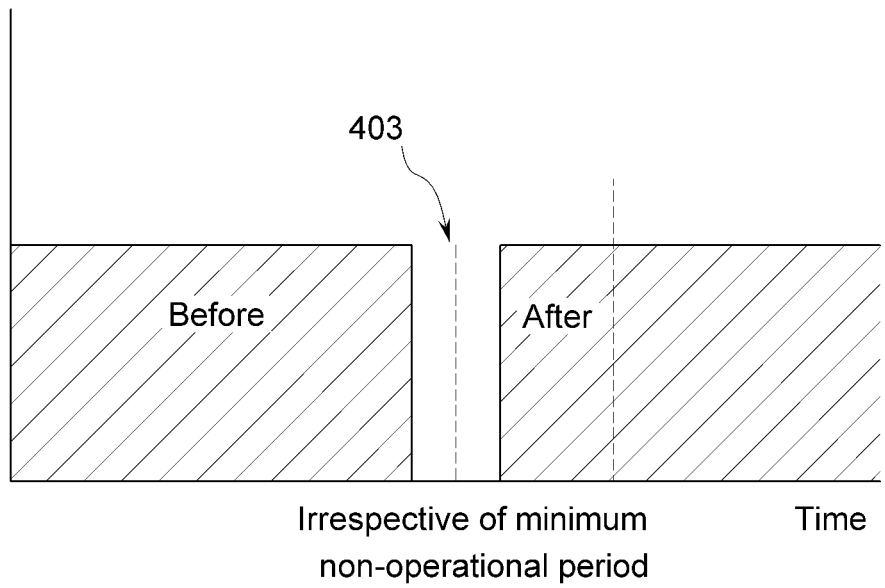
Figure 4D:
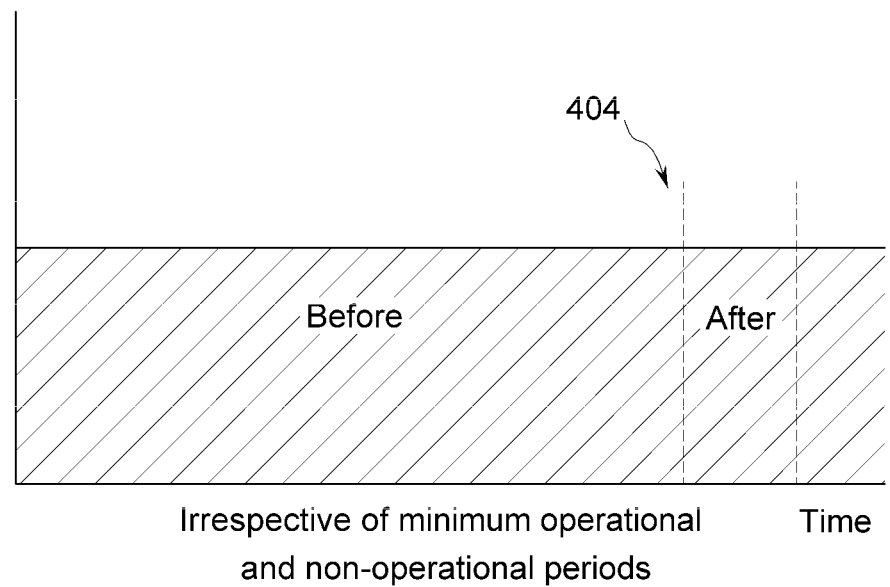

FIG. 3 is a view illustrating a system of automatically analyzing infrastructure operation data according to some example embodiments of the present invention.

An infrastructure operation determination unit 310 includes a plan standard information load unit 311 and a target facility/sensor select unit 312. The infrastructure operation determination unit 310 determines whether or not the infrastructure facility is operating and whether or not the automatic analysis on the operation data of the infrastructure facility is to be executed. The plan standard information load unit 311 analyzes the significant difference of the data and receives the plan standard information to analyze the result. The plan standard information is the standard information of the infrastructure facility or the sensor. That is, the plan standard information may be the standard information that may be judged as valid data. The standard information of the infrastructure facility may be a facility operation determining standard, for example, the minimum non-operation period or the minimum operation period, the previous operation period, the succeeding operation period, a change point synchronization, a daily analysis, an equality significance level, control level variables, a change rate tolerance, a settling time, or the like.

Thereafter, the target facility/sensor select unit 312 selects the target facility or sensor. The target facility is a facility that is subject to automatic analysis, and the target sensor is a sensor that collects data to be subject to automatic analysis in the target facility. The target facilities may include air conditioners, freezers, boilers, air compressors, ultrapure water feeders, gas or chemical feeders, or the like. The target sensors may include sensors for measuring pressure, temperature, flow, current, voltage, power, load rate or concentration.

In the target facility, the state change, such as operation or non-operation of the facility, is detected, and whether the facility is operated for a predetermined period of time or longer in the previous operation period or in the succeeding operation period is determined.

A data reception unit 320 includes an after period select unit 321, a before period select unit 322, an after data reception unit 323, and a before data reception unit 324.

The data reception unit 320 selects a period for collecting data, and collects data in each period. The after period select unit 321 sets a start time of the process as a start time and sets an end time. That is, the after period select unit 321 sets the succeeding operation period. The before period select unit 322 sets an end time of an immediately previous process as an end time, and sets a time which is obtained by subtracting the length of the previous operation period from the end time as a start time. That is, the before period select unit 322 sets the previous operation period.

The after data reception unit 323 collects an instantaneous value in the succeeding operation period and calculates a summary data. The instantaneous value may be a measurement value of about 1 second to several seconds. The summary data may be a numerical value for the instantaneous value ranging from a few minutes to a few tens of minutes, and may be an average, a dispersion plot, or the like.

The before data reception unit 324 collects an instantaneous value in the previous operation period, and calculates a summary data. The instantaneous value may be a measurement value of about 1 second to several seconds. The summary data may be a numerical value for the instantaneous value ranging from a few minutes to a few tens of minutes, and may be an average, a dispersion plot, or the like.

A data filtering unit 330 includes a quartile calculation unit 331 and an outlier removal unit 332.

The data filtering unit 330 performs filtering to extract only data used for analysis.

The quartile calculation unit 331 extracts numbers corresponding to Q1 (a number corresponding to an accumulated percentage of about 25%), Q3 (a number corresponding to an accumulated percentage of about 75%), a median, and an inter quartile range (IQR). The outlier removal unit 332 removes the outlier by a Carling's modification method or by setting an upper limit or a lower limit based on 1.5 times or 3 times of the IQR, and removing numbers out of the upper limit and the lower limit.

A statistics calculation unit 340 includes an after statistics calculation unit 341 and a before statistics calculation unit 342.

The statistics calculation unit 340 calculates statistics for the succeeding operation period and the previous operation period. The after statistics calculation unit 341 calculates statistics, such as an average, a standard deviation, a degree of freedom, and a coefficient of variation, on the basis of the data collected in the succeeding operation period. The before statistics calculation unit 342 calculates an average, a standard deviation, a degree of freedom, a coefficient of variation, a skewness, a kurtosis, or the like, based on the data collected in the previous operation period, and a correction value considering the skewness, the kurtosis, or the like is calculated.

A significant difference analysis unit 350 includes an equality verification unit 351, a control level verification unit 352, a change rate verification unit 353, and a final determination unit 354.

The significant difference analysis unit 350 performs, for example, an identification verification, a control level verification, a change rate verification, a final determination, or the like so as to determine whether there is a significant difference between the data collected in the succeeding operation period and the data collected in the previous operation period.

The equality verification unit 351 calculates an equality boundary, such as a mean difference, an integrated variance/a degree of freedom, a t-distribution value or an f-distribution value, UEL, LEL, or the like, and performs correction of the skewness, the kurtosis, or the like.

The equality verification unit 351 produces determination results, for example, identical or non-identical.

The control level verification unit 352 calculates an average or a standard deviation of the values of the previous operation period. In addition, the control level verification unit 352 calculates a control boundary such as UCL or LCL to perform correction of the skewness, the kurtosis, or the like.

The control level verification unit 352 calculates the number of data of the succeeding operation period that exceeds the control boundary.

The change rate verification unit 353 calculates a difference in change rate between the succeeding operation period and the previous operation period. When the difference in change rate exceeds a tolerance, it is determined whether or not the change rate is increased or decreased.

The final determination unit 354 determines that a significant difference has occurred if the result is out of a standard value in one or more verification tests.

A result determination unit 360 includes a data storing unit 361, a report mailing unit 362, an analysis screen unit 363, and a technical determination unit 364.

The result determination unit 360 performs, for example, data storage, report mailing, analysis screen provision, technical determination, or the like.

The data storing unit 361 stores summary results for each facility or detailed results for each sensor.

The report mailing unit 362 automatically reports the analysis result of the significant difference to an electronic device, mail or a mobile phone.

The analysis screen unit 363 provides analysis results for each facility and each sensor. The analysis results may be represented through numerical presentations of various statistics and charts.

The technical determination unit 364 determines whether the engineer should accept the analysis result of the significant difference in consideration of the technical tolerance based on the analysis results of the significant difference in the statistics or the chart. In addition, if it is determined that a significant difference has occurred, the detailed cause of the significant difference occurrence and the results of responsive actions are registered. In such an embodiment, the technical judgment, the cause of the significant difference, and the result of the responsive action are classified and stored.

According to some example embodiments, the functionality of the various units (or modules) illustrated in FIG. 3 may be implemented by way of one or more processors coupled to a memory, the memory storing instructions that, when executed by the one or more processors, cause the one or more processors to execute the various operations.

FIGS. 4A, 4B, 4C, and 4D are views illustrating standards for determining the operation of infrastructure facilities.

The facility state managed by the related art facility monitoring system stores the change history by calculating the real-time operation state through a combination formula of each facility state parameter. However, if such state change information of the facilities is directly utilized, problems of, for example, unexpected operation events and errors in the analysis target period may occur due to temporary operation or inactive operation that may occur in the facility operation. As such, because the automatic analysis cannot be appropriately carried out merely based on the facility state change information, the automatic analysis should be executed by determining the state of the facility, whether the facility is operated or not operated, based on the minimum operation period and the minimum non-operation period depending on the characteristics of each facility operation and maintenance.

Referring to FIGS. 4A, 4B, 4C, and 4D, although the facility is operated within a period in time 401 that is less than the minimum operation period in the non-operation period between the previous operation period and the succeeding operation period, this operation, which is a temporary operation or an instant operation, is not regarded as the operation of the facility. In addition, although the facility is not operated within a period in time 402 that is less than the minimum non-operation period in the operation period, this non-operation, which is a temporary non-operation or an instant non-operation, is not regarded as the non-operation of the facility.

An automatic analysis may be executed under the conditions of the maintenance time by using the maintenance information of the facility. In such an embodiment, automatic analysis is performed irrespective of the minimum non-operation period. That is, when the infrastructure facility is subject to maintenance after the previous operation period, the change point 403 occurs between the previous operation period and the infrastructure facility maintenance, and when an after operation is performed after the infrastructure facility maintenance, the automatic analysis is performed irrespective of the minimum non-operation period (see FIG. 4C).

In addition, an automatic analysis of the significant difference may be carried out before and after midnight during the operation of the facility. In such an embodiment, the automatic analysis may be performed starting from midnight 404, regardless of the state change of the infrastructure facility.

In the data filtering, an inter quartile range (IQR) method or a Carling's modification method may be used to remove outliers in statistical analysis. In such an embodiment, among the IQR or Carling's modification, the IQR method may be a primary method, and the Carling's modification method may be a secondary method. Alternatively, the Carling's modification method may be a primary method, and the IQR method may be a secondary method. The equations of the upper outlier limit (UOL) and the lower outer limit (LOL) for removing the outliers are as shown in Equation 1.

UOL=$Q3$+1.5*IQR or $Q3$+3*IQR

LOL=$Q1$−1.5*IQR or $Q1$−3*IQR  Equation 1

In Equation 1, Q1 is a number corresponding to an accumulated percentage of about 25%, and Q3 is a number corresponding to an accumulated percentage of about 75%. In addition, IQR is Q3−Q1.

In the statistical calculation, a whole average, a standard deviation, and a degree of freedom of the data in the succeeding operation period are calculated. In such an embodiment, the succeeding operation period may be unconstrainedly set within a period of 24 hours or less.

In addition, a whole average, a standard deviation, and a degree of freedom of the data; and a skewness and a kurtosis for correction are calculated for the previous operation period.

The degree of freedom is calculated by Welch Satterthwaite degrees, which is expressed by Equation 2.

$$\text{Welch Satterthwaite degree of freedom} = \frac{\left(\frac{s_1^2}{n_1} + \frac{s_2^2}{n_2}\right)^2}{\frac{s_1^4}{n_1^2(n_1-1)} + \frac{s_2^4}{n_2^2(n_2-1)}}$$  Equation 2

In Equation 2, s1 is a standard deviation within a day (in a group), s2 is a standard deviation between days (between groups), n1 is a degree of freedom within a day (in a group), and n2 is a degree of freedom between days (between groups). In addition, the skewness k3 and the kurtosiss k4 are expressed by Equation 3.

$$k_3 = \frac{n}{(n-1)(n-2)} \sum_{i=1}^{n}\left(\frac{x_i - \bar{x}}{s}\right)^3$$

$$k_4 = \frac{n(n+1)}{(n-1)(n-2)(n-3)} \sum_{i=1}^{n}\left(\frac{x_i - \bar{x}}{s}\right)^4 - \frac{3(n-1)^2}{(n-2)(n-3)}$$  Equation 3

In an embodiment, the correction values for enlargement, reduction, and vertical movement of a verification boundary range considering the skewness and the kurtosiss of the sensor data are used in the equality verification or the control level verification. The upper limit correction value and the lower limit correction value that are applied to the upper limit and the lower limit are as shown in Equation 4.

upper limit correction value=1+(4*$k3$)/9*(1+
    $\delta$*$k\_3\hat{}2$)+0.25*$k\_4$/(1+$\lambda$*abs($k\_4$)

lower limit correction value=1−(4*$k3$)/9*(1+
    $\delta$*$k\_3\hat{}2$)+0.25*$k\_4$/(1+$\lambda$*abs($k4$))  Equation 4

In Equation 4, $\delta$ and $\lambda$ are used as a correction factor to define a correction formula that takes into account both the skewness and the kurtosis based on a function approximated to a random variable of 3 with a probability of about (1−0.27)% in the Cornish-Fisher expansion. In the present embodiment, the coefficient values are defined as $\delta$=0.2 and $\lambda$=0.5, so that each maximum value of the skewness correction and the kurtosis correction converges to about 1.5. In such an embodiment, the maximum variation of the enlargement and reduction of the verification boundary range in case of the kurtosis correction and of the vertical movement of the verification boundary range in case of the skewness verification becomes an optimum value that does not deviate from a center value (average).

In the equality verification step, a t-test, a hypothesis verification method, is performed to determine whether a center value (average) of the past data and a center value (average) of the current data are equal to each other in a single sensor. In order to determine whether the data of the succeeding operation period is equal to the data of the previous operation period, the t-value calculation equation is modified to calculate the equality verification boundary. The equality verification boundary is represented by an upper equivalent limit (UEL) or a lower equivalent limit (LEL), which are as shown in Equation 5.

UEL,LEL=Before average±Integrated standard
    deviation*$t$-value*upper/lower limit correction
    value  Equation 5

In Equation 5, t-value is calculated based on an appropriate level of significance $\alpha$/2 and an integrated degree of freedom of the previous operation period and the succeeding operation period.

The level of significance ($\alpha$) may vary, and the equality verification boundary may be corrected depending on various sensor types and data characteristics. According to the result of the equality verification, if the average of the data of the succeeding operation period deviates from the UEL or LEL, which are the equality verification boundary, the determination of "non-identical" is resulted.

In the control level verification, it is determined whether or not the current values are within the specifications in consideration of the average and standard deviation of the past data in a single sensor. In order to determine the stability of the data of the succeeding operation period as compared to the data of the previous operation period, the specification having the range of "c-value" times of the standard deviation is calculated.

The upper control limit (UCL) and the lower control limit (LCL) for the specification calculation are expressed by Equation 6.

UCL,LCL=Before average±Before standard
    deviation*$c$-value*upper/lower limit correction
    value  Equation 6

The control variables (c-value) may vary, and the equality verification boundary may be corrected depending on various sensor types and data characteristics.

According to the verification result, in the case where each data value is out of the specification (UCL and LCL) range, it is determined that the level of control is degraded.

In the change rate verification, the dispersion is compared in consideration of a difference in average between the past and the present, which is expressed by Equation 7.

$$\text{Change rate difference} = \left(\left(\frac{\text{After standard deviation}}{\text{After average}}\right) - \left(\frac{\text{Before standard deviation}}{\text{Before average}}\right)\right) * 100$$

In the change rate verification, the tolerance for controlling the change rate difference may vary according to various sensor types and data characteristics.

According to the result of the change rate verification, in the case where the change rate difference value exceeds the tolerance, it is determined that the change rate is increased.

Figure 5A:
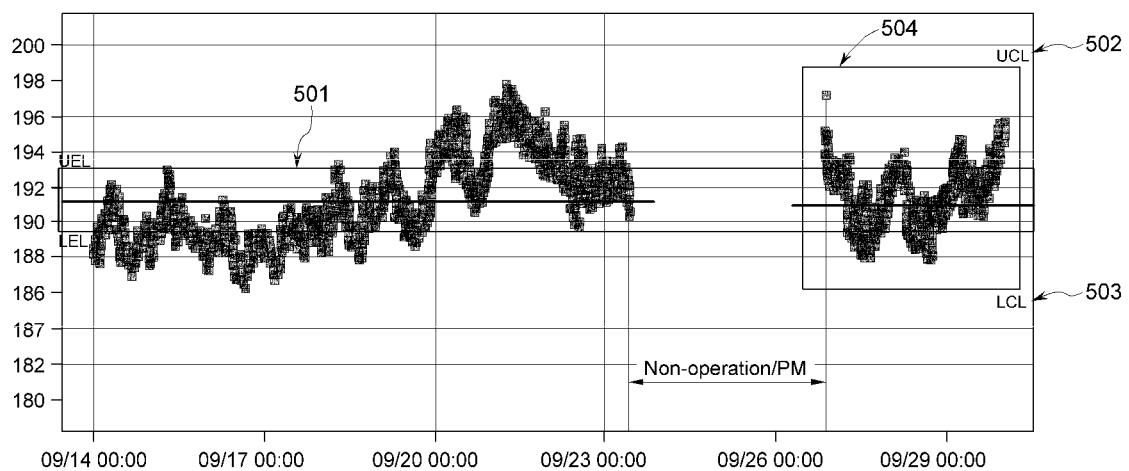
FIGS. 5A and 5B are views illustrating results of an analysis according to some example embodiments of the present invention.
Figure 5B:
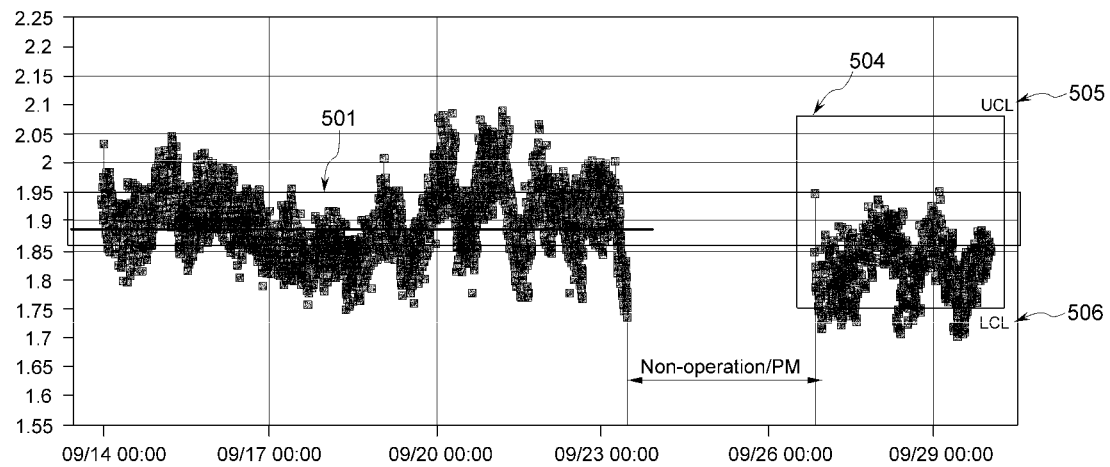

FIGS. 5A and 5B are views illustrating results of an analysis according to some example embodiment of the present invention. FIG. 5A is a graph showing a case in which there is no significant difference between the previous operation period and the succeeding operation period with respect to a cooling tower fan current. A box 501 represents UEL and LEL, and a box 504 represents UCL and LCL.

Data for the graph of FIG. 5A is shown in Table 1, below.

TABLE 1

|  | Before average | Before standard deviation | After average | After standard deviation |
|---|---|---|---|---|
| Statistics | 191.114 | 2.437 | 190.891 | 1.634 |

|  | Significance level | UEL | LEL | Result |
|---|---|---|---|---|
| Equality verification | 0.05 | 193.279 | 189.739 | Identical |

|  | Control variables | UCL | LCL | Out Count |
|---|---|---|---|---|
| Control level verification | 3 | 198.880 | 186.181 | 0 |

|  | Before change rate | After change rate | Change difference | Tolerance |
|---|---|---|---|---|
| Change rate verification | 1.275% | 0.856% | −0.419% | <0% |

The equality verification compares the average of the previous operation period and the average of the succeeding operation period, and the determination of "identical" is determined because the average is not out of UEL and LEL.

The control level verification determines whether each value of the succeeding operation period is out of a UCL 502 or a LCL 503, and the system may determine that there is no significant difference in data because the number of values out of the UCL 502 or the LCL 503 is 0.

FIG. 5B is a graph showing a case in which there is a significant difference between the previous operation period and the succeeding operation period for a cooling tower fan vibration. A box 504 represents UCL and LCL.

Data for the graph of FIG. 5B are shown in Table 2, below.

TABLE 2

|  | Before average | Before standard deviation | After average | After standard deviation |
|---|---|---|---|---|
| Statistics | 1.897 | 0.061 | 1.808 | 0.038 |

TABLE 2-continued

|  | Significance level | UEL | LEL | Result |
|---|---|---|---|---|
| equality verification | 0.05 | 1.950 | 1.856 | Non-identical |

|  | Control variables | UCL | LCL | Out Count |
|---|---|---|---|---|
| Control level verification | 3 | 2.088 | 1.750 | 23 |

|  | Before change rate | After change rate | Change rate difference | Tolerance |
|---|---|---|---|---|
| Change rate verification | 3.239 | 2.087 | −1.152 | <0% |

In the equality verification, because the average of the succeeding operation period is out of the lower limit, the determination of "non-identical" is determined.

In the control level verification, because the number of values out of a UCL 505 or a LCL 506 is 23, the system may determine that there is a significant difference in data.

The standard information of the analysis gives the engineer a degree of freedom in changing the specification of the significant difference analysis depending on the maintenance, abnormality, quality control characteristics of the infrastructure facility and the type of sensor. For example, information such as the minimum operation or non-operation period, the previous or succeeding operation period, the settling time, the significance level, the control variables, the change rate tolerance, or the like may be set differently depending on the facility or sensor.

In addition, a best of best (BOB) period, which is a period that has operated most ideally, may be selected as a reference period of data for the significant difference analysis to be fixedly used as the previous operation period, rather than defining, as the previous operation period, an operation period that is immediately before the analysis.

The type of the standard information is represented in Table 3, below.

TABLE 3

| Classification | Description |
|---|---|
| Minimum non-operation period | Determined as a non-operation period if conditions of being longer than a considerable non-operation period and an input time are satisfied (for the purpose of excluding an instant stop of operation). |
| Minimum operation period | Determined as an operation period if conditions of being longer than a considerable operation period and an input time are satisfied (for the purpose of excluding an instant operation (e.g., test)). |
| Previous operation period | A data period of an immediately before operation period that is subject to a significant difference determination (the last operation end time - input period ~ the operation end time). |

TABLE 3-continued

| Classification | Description |
| --- | --- |
| Succeeding operation period | A data period during which the facility is operated and which is subject to a significant difference determination (recent start time ~ start time + input period). |
| Settling Time | A time to be excluded from the after data so as to eliminate outliers (a period before stabilization) depending on the facility characteristics. |
| Change point synchronization | Set whether to analyze if an event information such as facility PM is generated. |
| Daily analysis | Execute the significant difference analysis at midnight or before/after the facility operation, irrespective of (or in addition to) the standard of the infrastructure operation determination. |
| Significance level of equality | Control value of the significance level ($\alpha$) in the calculation of UEL and LEL in the equality verification of the average and dispersion. |
| Control level variables | Control variables (c-value) in the calculation of UCL and LCL in the control level verification. |
| Change rate tolerance | A standard value for the change rate verification. Determined as having a significant difference when a difference between after-before change rates exceeds the standard value. |

FIGS. 6 and 7 are views showing an automatic report screen according to some example embodiments of the present invention.

Referring to FIGS. 6 and 7, the analysis of the significant difference for each facility is notified to the engineer after the automatic analysis according to the operation of the facility. The analysis report includes summary analysis results of the analysis and detailed analysis results in which the detailed analysis result for each facility and for each sensor may be checked immediately.

The detailed analysis results may include detailed facility analysis results, detailed analysis results for each sensor, and data trends.

The detailed facility analysis results may include a target facility, the information of parameters of the facility, the operation state change information of the facility, and the analysis result information. For example, the detailed facility analysis results may further include the parameter analysis result, the operation state change information of the facility, the previous operation period, the succeeding operation period, the determining standard of the facility operation, the set information of the previous operation period and the succeeding operation period. The information of the parameters of the facility may include the target quantity, the verification result, and the final pass rate.

The detailed analysis result for each sensor may include target parameter information, detailed analysis results for each verification item, the number of data and standards for each verification. The target parameter information may include the name and priority of the sensor, and the final pass or fail.

The data trends may include a control chart and box plot comparison, which represent data trends for each sensor.

When it is determined as the result of the automatic analysis that there is a significant difference, the engineer decides whether or not to accept the automatic analysis result of the significant difference. That is, the engineer finally decides the result of the significant difference analysis. The system receives the decision of the engineer and registers the determination and the cause and results of responsive actions of the significant difference. In addition, the system classifies and accumulates the determination results, calculates the statistics, and conducts the learning, such that when the system analyzes the results of the significant difference in the future, it automatically reflects the learning results and analyzes the results of the significant differences.

Figure 8:
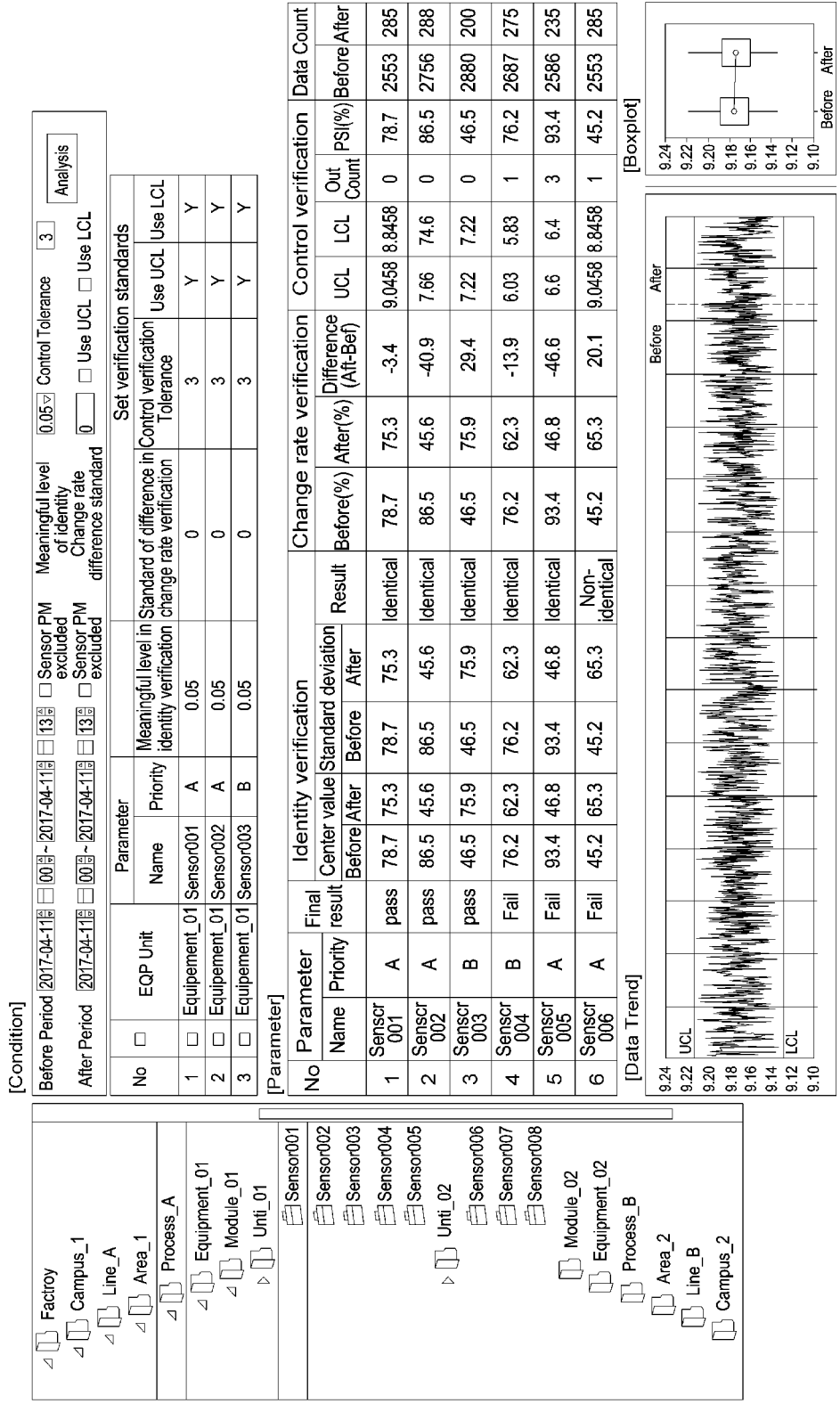
FIG. 8 is a view showing an analysis simulation screen according to some example embodiments of the present invention.

FIG. 8 is a view showing an analysis simulation screen according to some example embodiments of the present invention.

Referring to FIG. 8, the analysis simulation screen may include an input screen for inputting or selecting a target facility, a target sensor, a previous operation period, a succeeding operation period, verification classifications, and verification levels. In the input screen of the previous operation period, whether the BOB period is applicable may be input.

The simulation results may include detailed facility analysis results, detailed analysis results for each sensor, and data trends in the same manner as the automatic analysis result report screen.

As such, a method of automatically analyzing infrastructure operation data according to an embodiment of the present invention may detect abnormality or fluctuation in advance and may reduce potential risk of accident through monitoring of slight fluctuation and quality inspection of major factors after the change of facilities such as preventive maintenance. In addition, as the point in time of the facility operation analysis may be automatically determined to perform the data analysis automatically, analysis by the engineer may be reduced and automatic analysis activities may be enhanced.

In addition, by automatically reporting the determination result of the significant difference for each operating facility, the omission of operation data confirmation after the operation of the facility may be substantially prevented or reduced.

As a significant difference analysis algorithm based on statistics is applied, analytical results may be quickly and accurately calculated and the reliability of operation of facilities may be ensured.

Further, system performance may be improved based on the statistical analysis and the engineer's empirical knowledge-based machine learning through accumulation of engineer's empirical technical judgment information.

As set forth hereinabove, according to one or more example embodiments, a system of automatically analyzing infrastructure data may analyze whether there is a significant difference between the data of the previous operation period and the data of the succeeding operation period.

According to one or more example embodiments, a system of automatically analyzing infrastructure data may detect abnormality or fluctuation in advance and may reduce potential risk of accident.

According to one or more example embodiments, a system of automatically analyzing infrastructure data may quickly and accurately calculate analytical results and ensure the reliability of facility operation.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

While the present invention has been illustrated and described with reference to the exemplary embodiments thereof, it will be apparent to those of ordinary skill in the art that various changes in form and detail may be formed thereto without departing from the spirit and scope of the present invention. The present invention is defined by the following claims, with equivalents of the claims to be included therein.

What is claimed is:

1. A system for analyzing infrastructure operation data, the system comprising:
one or more processors; and
a memory coupled to the one or more processors, wherein the memory stores instructions executable by the one or more processors, wherein the one or more processors are programmed to execute the instructions to:
determine, by the one or more processors, a reference operation period, the reference operation period being a period in time for which the system is minimally operated in an operation period before a non-operation period;
detect, by the one or more processors, a state change of an infrastructure comprising a plurality of facility components, the state change of the infrastructure being determined based on operation states of one or more facility components of the plurality of facility components determined based on sensor data from corresponding sensors, wherein the one or more processors monitor the sensor data from the sensors each corresponding to an operating condition of a respective facility component to detect a change from a non-operation state to an operation state of the respective facility component;
determine, by the one or more processors, that the operation state continues over an operation period that is substantially equal to or longer than the reference operation period; and
start, based on detecting the state change of the infrastructure and the operation state continuing over the operation period that is substantially equal to or longer than the reference operation period, executing an analysis only on the operation data of the operation period that is substantially equal to or longer than the reference operation period,
wherein the one or more processors are configured to establish a start time to start the analysis and an end time to end the analysis based on the reference operation period, and
wherein the executing the analysis on the operation data comprises:
monitoring, by the one or more processors and based on the established start time and end time, the sensor data from the sensors corresponding to the one or more facility components to generate operation data of a first operation period and the sensor data from the sensors corresponding to the one or more facility components to generate operation data of a second operation period, the second operation period being a period of operation after the first operation period and after the non-operation period;
calculating statistics, by the one or more processors, for the operation data of the first operation period and the operation data of the second operation period; and
analyzing and determining a difference, by the one or more processors, between the operation data of the first operation period and the operation data of the second operation period based on the statistics.

2. The system of claim 1, wherein the first operation period is at least a minimum operation period or longer.

3. The system of claim 1, wherein the first operation period is a best of best period.

4. The system of claim 1, wherein determining whether or not to execute a further analysis is based on the operation state of the infrastructure and analysis conditions according to the operation state.

5. The system of claim 1, wherein the second operation period is after a minimum non-operation period.

6. The system of claim 1, wherein the instructions further cause the one or more processors to analyze the difference between the operation data of the first operation period and the operation data of the second operation period by using at least one of an equality verification, a control level verification, and a change rate verification.

7. The system of claim 6, wherein the instructions further cause the one or more processors to set a verification boundary for the operation data and to determine whether or not the operation data is within the verification boundary.

8. The system of claim 7, wherein the instructions further cause the one or more processors to set a correction value for the verification boundary by applying a skewness and a kurtosis of the operation data, and to determine whether the operation data is within the verification boundary.

9. The system of claim 1, wherein the executing the analysis on the operation data further comprises:
comparing a result of the difference between the operation data of the first operation period and the operation data of the second operation period with a threshold to determine a result of the difference analysis; and
determining whether to analyze current operation states of the plurality of sensors based on a result of the comparison between the result of the difference and the threshold.

10. The system of claim 9, wherein the result of the difference comprises a summary analysis result and a detailed analysis result.

11. The system of claim 10, wherein the detailed analysis result comprises a facility analysis result and an analysis result for each of the sensors.

12. The system of claim 9, wherein the instructions further cause the one or more processors to receive a determination for the difference and to register the determination.

13. The system of claim 9, wherein, in response to the result of the difference being greater than the threshold, the instructions further cause the one or more processors to register a cause and results of responsive actions, to calculate statistics of the cause and the results of the responsive actions, and to learn the cause and the results of the responsive actions.

14. A method of analyzing infrastructure operation data, the method comprising:
   determining, by the one or more processors, a reference operation period, the reference operation period being a period in time for which a system is minimally operated in an operation period before a non-operation period;
   detecting, by the one or more processors, a state change of an infrastructure comprising a plurality of facility components, the state change of the infrastructure being determined based on operation states of one or more facility components of the plurality of facility components determined based on sensor data from corresponding sensors, wherein the one or more processors monitor the sensor data from the sensors each corresponding to an operating condition of a respective facility component to detect a change from a non-operation state to an operation state of the respective facility component;
   determining, by the one or more processors, that the operation state continues over an operation period that is substantially equal to or longer than the reference operation period;
   and
   start executing, by the one or more processors, based on detecting the state change of the infrastructure and the operation state continuing over the operation period that is substantially equal to or longer than the reference operation period, an analysis only on the operation data of the operation period that is substantially equal to or longer than the reference operation period,
   wherein the one or more processors establish a start time to start the analysis and an end time to end the analysis based on the reference operation period, and
   wherein the executing the analysis on the sensor data comprises:
      monitoring, by the one or more processors and based on the established start time and end time, the sensor data from the sensors corresponding to the one or more facility components to generate operation data of a first operation period and the sensor data from the sensors corresponding to the one or more facility components to generate operation data of a second operation period, the second operation period being a period of operation after the first operation period and after the non-operation period;
      calculating, by the one or more processors, statistics for the operation data of the first operation period and the operation data of the second operation period;
      analyzing and determining, by the one or more processors, a difference between the operation data of the first operation period and the operation data of the second operation period based on the statistics.

15. The method of claim 14, wherein the first operation period is at least a minimum operation period or longer.

16. The method of claim 14, wherein the first operation period is a best of best period.

17. The method of claim 14, wherein whether to execute a further analysis is determined according to the operation state of the infrastructure and analysis conditions according to the operation state.

18. The method of claim 14, wherein the second operation period is after a minimum non-operation period.

19. The method of claim 14, wherein analyzing the difference comprises analyzing the difference between the operation data of the first operation period and the operation data of the second operation period by using at least one of an equality verification, a control level verification, and a change rate verification.

20. The method of claim 19, wherein analyzing the difference comprises setting a verification boundary for the operation data and determining whether the operation data is within the verification boundary.

21. The method of claim 20, wherein analyzing the difference comprises setting a correction value for the verification boundary by applying a skewness and a kurtosis of the operation data, and determining whether the operation data is within the verification boundary.

22. The method of claim 14, wherein the executing the analysis on the operation data further comprises:
   comparing a result of the difference between the operation data of the first operation period and the operation data of the second operation period with a threshold to determine a result of the difference analysis; and
   determining whether to analyze current operation states of the plurality of sensors based on a result of the comparison between the result of the difference and the threshold.

23. The method of claim 22, wherein determining the result of the difference comprises reporting a summary analysis result and a detailed analysis result.

24. The method of claim 23, wherein the detailed analysis result comprises a facility analysis result and an analysis result for each of the sensors.

25. The method of claim 22, wherein determining the result of the difference comprises receiving a determination of the difference and registering the determination.

26. The method of claim 22, wherein determining the result of the difference comprises registering a cause and results of responsive actions, calculating statistics of the cause and the results of the responsive actions, and learning the cause and the results of the responsive actions, in response to the result of the difference being greater than the threshold.

* * * * *